April 5, 1949.   C. W. BERTHIEZ   2,466,198
DEVICE FOR CONTROLLING MOVABLE
MEMBERS OF MACHINES
Filed April 11, 1945   5 Sheets-Sheet 1

Charles William Berthiez
INVENTOR
By George Hevrey
His Attorney

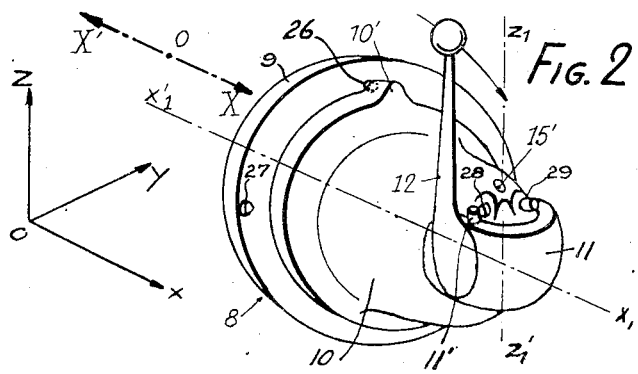
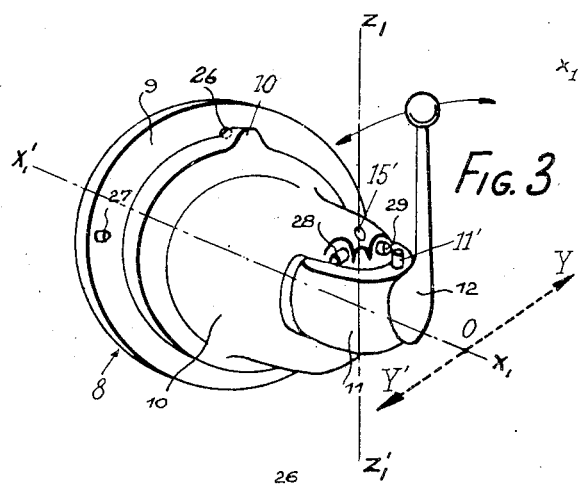
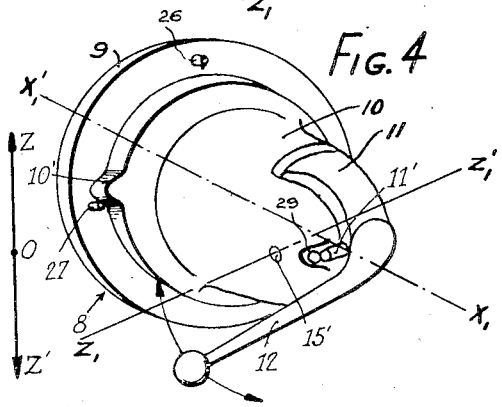

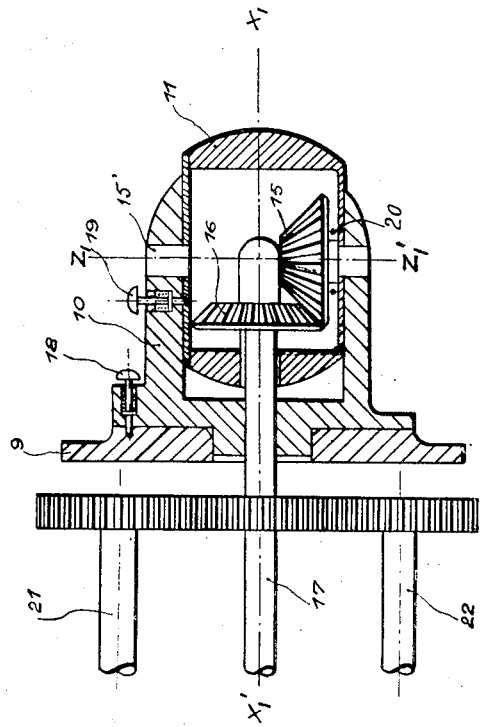
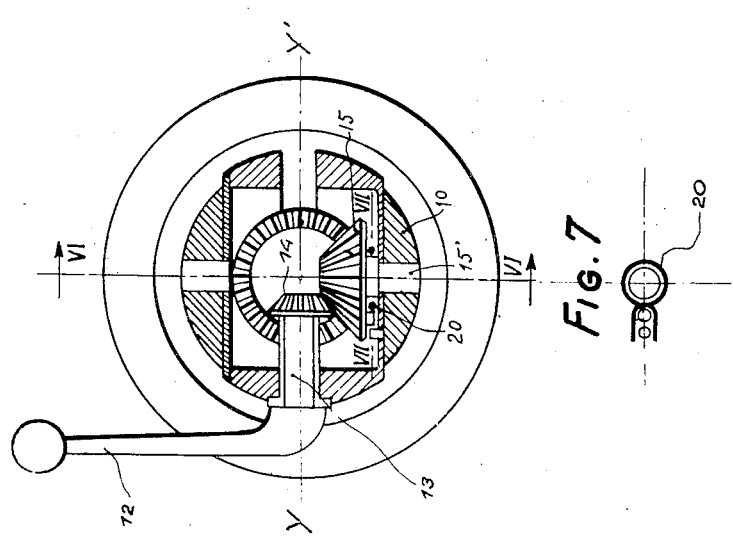

April 5, 1949.    C. W. BERTHIEZ    2,466,198
DEVICE FOR CONTROLLING MOVABLE
MEMBERS OF MACHINES
Filed April 11, 1945    5 Sheets-Sheet 4
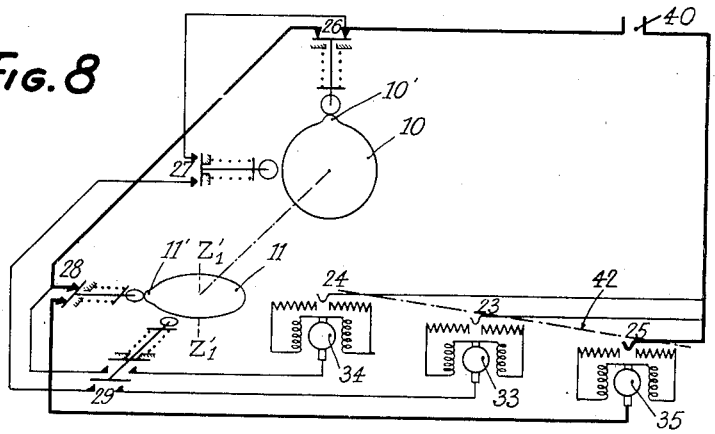
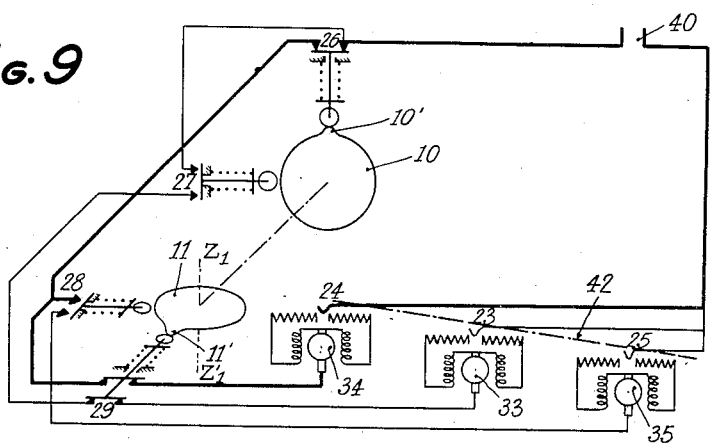
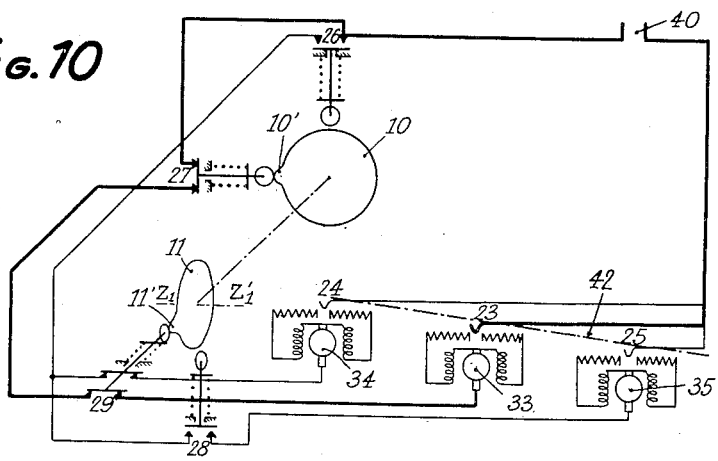
Charles William Berthiez
INVENTOR
By George H. Cory
His Attorney

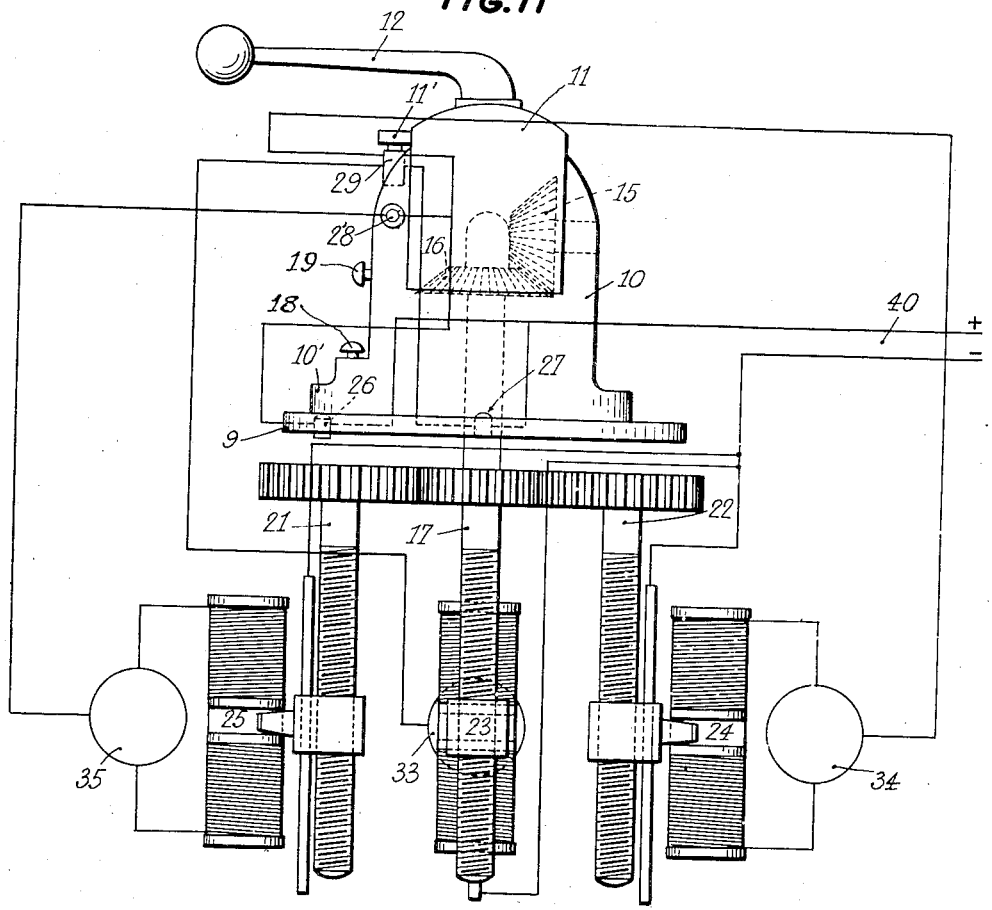

Patented Apr. 5, 1949

2,466,198

UNITED STATES PATENT OFFICE 2,466,198

DEVICE FOR CONTROLLING MOVABLE MEMBERS OF MACHINES

Charles William Berthiez, Paris, France

Application April 11, 1945, Serial No. 587,776
In France January 21, 1944

Section 1, Public Law 690, August 8, 1946
Patent expires January 21, 1964

11 Claims. (Cl. 318—39)

This invention relates generally speaking to the control and the adjustment of the motions of movable members or parts of machines and has more particular though not exclusive reference to the manual control of automatic motions of carriages and other sliding parts of machine tools.

In a co-pending application Serial No. 587,775, filed April 11, 1945, is described a controlling device utilising a single lever which brings about the starting in the required direction, the speed of motion of the movable member and the stoppage thereof in such a manner that said lever should be handled in an instinctive way by the operator. In said co-pending application is described by way of particular constructional form of the invention a controlling device of this class comprising a pair of levers permitting three movable parts of the machine to be displaced along three spatial directions.

It is an object of the present invention to provide, as a development of the subject matter of said co-pending application, a new or improved control device including a single lever permitting the displacements of said movable members to be effected along three spatial directions, said lever being arranged on a special carrier of novel structure which can revolve in a body supported by the machine base.

Another object of the invention is to provide a device as aforesaid wherein the lever carrier and the supporting body therefor have cooperative latches permitting them to be locked together to suit operational requirements.

A further object of the invention is to provide a device as aforesaid wherein said single lever is adapted, while causing starting and stopping of the controlled members or parts of the machine, to control their direction of motion and their speed.

A still further object of the invention is to provide a control device as aforesaid wherein the single lever in question may assume in the space three neutral positions from which it may be rocked on one side or the other in three perpendicular planes, the motions of the lever being transmissible to devices which may be of various types, for example to hydraulic or pneumatic means or to mechanical gears or, alternatively, to contacts connected to the circuit of an electrical operating means.

With these and such other objects in view as will incidentally appear hereafter, the invention comprises the novel construction and combination of parts that will now be described in detail with reference to the accompanying diagrammatic drawings exemplifying suitable embodiments of the invention and forming a part of the present disclosure.

In the drawings:

Fig. 2 is a perspective view showing a single control lever providing control of three operational movements along the three axes of rectangular coordinates of the machine tool represented in Fig. 1, said lever being so arranged according to this showing as to control the transverse motion along the coordinate axis OX.

Fig. 3 is a perspective view showing the same lever in position to control the longitudinal motion along the coordinate axis OY.

Fig. 4 is a perspective view showing the same lever in position to control the vertical motion along the coordinate axis OZ.

Fig. 5 is a sectional view of the control device taken in a vertical plane passing through the rotational axis of the lever, assuming said lever to occupy a position corresponding to that shown in Fig. 2.

Fig. 6 is a sectional view on the line VI—VI of Fig. 5.

Fig. 7 is a fragmentary sectional view on the line VII—VII of Fig. 5.

Figs. 8, 9 and 10 are diagrammatic views illustrating the selection of the electric circuits which control the variation of the feeding motion, these three views illustrating the circuits which are established when the lever respectively assumes the positions indicated in Figs. 2 to 4.

Fig. 11 shows diagrammatically the motors and the rheostats controlling these motors connected for operation by the control device shown in Figs. 2 to 7 inclusive.

Figure 1:
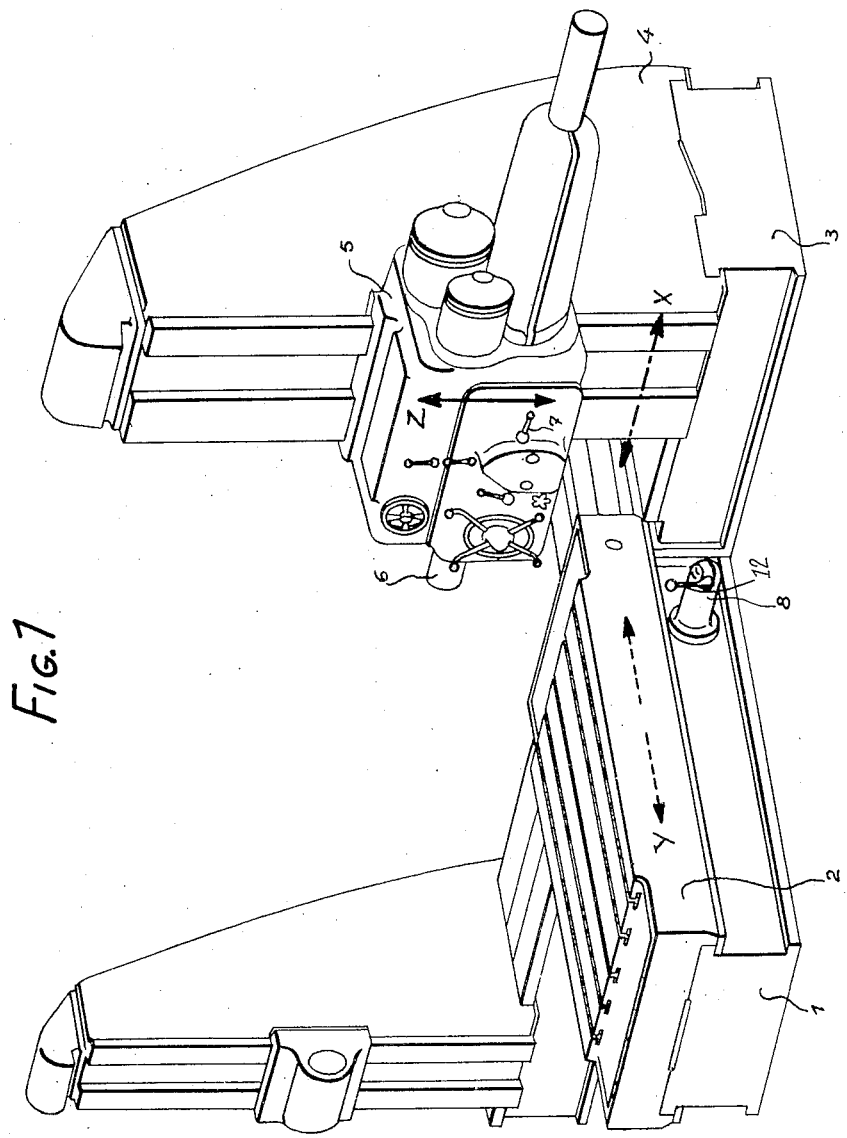
Fig. 1 is a perspective view showing in its entirety a metal-working machine tool belonging to the class of combined milling and boring shaper machines to which the invention may be for example applied.

On the accompanying drawings, the bed of the machine selected by way of example for purposes of illustration is designated by 1. At the upper slideway of the bed is slidably arranged a table 2 adapted to receive the work piece which requires to be machined and to allow this workpiece to be moved to and fro along the axis OY.

A second bed designated by 3 and extending at right angles to the bed 1 serves as a slideway for a vertical upright 4 which permits the tool to be moved to and fro with respect to the work along the axis OX. Along the vertical face of the upright 4 is slidably arranged a carriage 5 which carries all the members for controlling the rotation of the tool-carrying spindle 6. The carriage 5 permits the tool to be moved to and fro with respect to the work, along the axis OZ.

The spindle 6 is mounted for sliding motion inside the carriage 5 along an axis OX extending parallel to the displacement of the vertical upright 4 on its guiding bed 3. A lever 7 is operable to cause automatic movement to be imparted either to the spindle 6 or to the upright 4.

A multiple function device 8 having a single control lever 12 is provided according to the invention and permits the three motions above described to be controlled. The device 8, as shown in Figs. 2, 3 and 4, comprises a flanged base 9 for supporting and securing the unit to the machine frame, a substantially cylindrical body 10 supported by the flanged base 9 and which is normally locked thereto but can be revolved, after being unlocked, about an axis $X_1$—$X'_1$. The cylindical body 10 is bowl-shaped at its front end and receives a barrel shaped part 11 which is normally locked but may be revolved, after being unlocked, about an axis $Z_1$—$Z'_1$. The barrel part 11 carries the lever 12 rockably mounted about an axis extending at right angles to its own axis $Z_1$—$Z'_1$.

When the lever 12 assumes its position represented in Fig. 2 it controls the transverse motions of the upright 4 or spindle 6 along the axis OX depending upon the position of the lever 7. A rocking-motion of the said lever 12 in the one or the other of the two opposite directions indicated in Fig. 2, produces movement of the upright 4 or the spindle 6 in the same direction.

In order to control the longitudinal motions of the table 2, it is necessary to bring the lever to the position shown on Fig. 3. To accomplish this the part 11 should be unlocked, by operation of latch 19, Fig. 6, and rocked 90° from left to right about the axis $Z_1$—$Z'_1$ (Fig. 2) and re-locked in its new position shown in Fig. 3, whereupon control of the longitudinal motions of the table 2 along the axis OY is rendered possible by rocking the lever 12 in the directions indicated by the arrows on Fig. 3, the table 2 being moved in the same direction.

In order to control the vertical motions of the carriage 5 along the vertical upright 4, it is necessary to bring the lever 12 to the position represented in Fig. 4 and to that end to have unlocked the cylindrical body 10, by operation of latch 18, Fig. 6, rotating the body 10 90° on axis $X_1$—$X'_1$ so as to bring the lever into horizontality, and then relocking the body 10 in its new position. When the lever 12 is rocked in one of the opposite directions as indicated by the arrows in Fig. 4, the carriage 5 is shifted upon the upright 4 either along the axis OZ or along the axis OZ'.

Before describing the control of the relative positions of the lever with respect to the three coordinate axes OX, OY and OZ, a description will now be given of the inner control mechanism which transmits to the controlled members 2, 4, 5, 6 those motions which are the result of the movements of the lever 12. This mechanism is represented in Figs. 5, 6 and 7.

As will be seen, the lever 12 is operatively connected to shaft 13 which is provided at its end with a bevel pinion 14 meshing with another bevel pinion 15 rotatable in the body 10 and carried by a stub shaft 15' arranged concentric with the barrel shaped carrier 11. The pinion 15 meshes in turn with another pinion 16 opera- tively connected to a shaft 17 arranged concentrically to the cylindrical body 10.

Latches 18 and 19 respectively securely hold the cylindrical body 10 against rotation on the flanged base 9 and the carrier 11 of the lever 12 against rotation with respect to the said body 10 in the different positions of said body and carrier.

A coiled torsion spring 20 (see particularly Fig. 7) constantly urges the pinion 15 and consequently the lever 12 to its middle position, no matter in what direction a deviation was imparted thereto. Therefore this spring automatically brings the lever 12 to the zero position as soon as the operator's hand ceases to act upon it. This arrangement for setting back the lever to the zero or neutral position might, however, be omitted without departing from the invention.

As shown in Fig. 6, a pair of shafts 21 and 22 are operatively connected with the shaft 17 through a gear train. The three shafts 17, 21 and 22 can respectively drive three rheostats or three switches so as to start and stop and to impart a variation (either continuously or step by step) in the speed of movement of the table 2, upright 4, carriage 5, or spindle 6, the proper rheostat being connected to the motors driving these members. If desired the shafts 17, 21 and 22 may be connected also to operate variable resistances connected to the field winding of a motor or the excitation of a generating or exciting unit belonging to a Leonard group or else to means for effecting pole commutation in case of a multiple speed induction motor. Without departing from the scope of the invention, however, the shafts 17, 21 and 22 might control any other electrical, hydraulic or mechanical starting, stopping and speed-changing devices.

In the showings of Figs. 8, 9 and 10, the cylindrical body 10 of the control device 8 and the barrel shaped carrier 11 thereof are so diagrammatically illustrated as to clearly show their action on the positioning electric contacts, it being understood that the control of the members 2, 4, 5, 6 to be moved may be ensured, for example, by means of direct current motors the speed of which is varied by changing their field.

In these figures 23, 24 and 25 designate three rheostats which operate, for example, to control three electric motors driving the members 2, 4, 5, 6. The wipers of such rheostats are actuated respectively by the three shafts 17, 21 and 22. Each rheostat circuit comprises a pair of two pole contacts connected in series. One of them is actuated by the cylindrical body 10, while the other one is actuated by the carrier 11 for the lever 12. The relative position of these two contacts in a given circuit in relation to the relative position of such contacts in the other two circuits, therefore, selects the circuit corresponding to the operating position of lever 12. The contacts which are alternately established by the cylindrical body 10 (for example by the projection 10') are the contacts 26 and 27 connected in the rheostat circuit as shown in Figs. 8 to 10, while the contacts alternately established by the barrel shaped carrier 11 for the lever 12 (for example by means of the projection 11' in Figs. 8 to 10) are the contact 28 and the twin two-pole contact 29.

A comparison of Figs. 8, 9 and 10 on one hand and Figs. 2, 3 and 4 on the other hand shows that:

The contact 26 is closed when the lever 12 occupies its positions shown in Figs. 2 and 3 and is open when it occupies position shown in Fig. 4;

The contact 27 is closed when the lever 12 occupies its position shown in Fig. 4 and is open when it occupies its positions shown in Figs. 2 and 3;

The contact 28 is closed when the lever 12 occupies its position shown in Fig. 2 and is open when it occupies its positions shown in Figs. 3 and 4;

The twin two-pole contact 29 is open when the lever 12 occupies its position shown in Fig. 2 and is closed when it occupies its positions shown in Figs. 3 and 4.

The conditioning of the electric circuits is effected automatically by the rotation of the parts 10 and 11 to effect opening and closing of the contacts 26, 27, 28 and 29. The rotation of one of these parts obviously causes all three shafts 17, 21 and 22 to be rotated since the lever 12 remains stationary in the barrel 11. The pinion 15, however, rotates in the body 10 on the vertical axis $Z_1$—$Z'_1$ and, therefore, rotates bevel gear 16 and shafts 17, 21 and 22. However, this rotation of the shafts and operation of the respective rheostats 23, 24, 25 may take place because only one circuit is closed at a time by the closing of two of the contacts 26 to 29 which are in series in a given circuit determined by the relative positions of the body 10 and of the carrier 11.

The coupling of the three shafts 17, 21 and 22 with the rheostat wipers is effected, moreover, in such a way that for each of the three positions assumed by the lever 12 in the inoperative or neutral position, the wiper of the corresponding rheostat will occupy the open circuit position in the connected circuit. The wipers belonging to the two other rheostats then occupy positions other than the open circuit position but these rheostats are ineffective to energize their motors since their circuits are open, the respective contacts 26, 27, 28 and 29 actuated by body 10 and carrier 11 being open. In Figs. 8, 9 and 10 the coupling of the rheostats by means of the shafts 17, 21 and 22 and the gearing is shown diagrammatically by the broken line 42.

In Figs. 8, 9 and 10 are shown in thick lines the circuits respectively corresponding to Figs. 2, 3 and 4 which are established owing to the position given to the lever 12 following an appropriate rotation, under the above-stated conditions, of the cylindrical body 10 and barrel shaped carrier 11 which carries the lever 12 to the settings shown in Figs. 2, 3 and 4. Movement of lever 12 to and fro at either side of the neutral position in each of the settings of Figs. 2, 3 and 4 produces forward and return movement of the corresponding members 4, 2 and 5 of the machine tool, Fig. 1, in the direction parallel to OX, OY and OZ.

In Fig. 11 is shown in elevation the assembly shown in section in Fig. 6 of the body 10 and of the carrier 11 which are supported on the flanged base 9, the shafts 17, 21 and 22 also being shown in Fig. 11 inter-connected by the gear train to drive these shafts upon rotation of the body 10 and the gear 11 on their axes, as described above. As shown in Fig. 11 the contact 26 is connected to one side of the source of electrical supply 40, this contact being operated by the projection or cam toe 10' upon rotation of the body 10 upon its axis. Connected in series with contact 26 is the contact 28 which is actuated by the cam toe 11' of carrier 11 when rotated to the position shown in Figs. 2 and 8 to connect the motor 35 and its rheostat 25 in circuit with the supply 40. With the carrier in the position shown in Figs. 2 and 8 the slide member of the rheostat 25 is moved when the shaft 21 is rotated by operation of the lever 12 from its neutral position to rotate the bevel gear 16 in the manner as described above in connection with Figs. 5 and 6. The motor 35 is thus controlled by the lever 12 for this setting of the body and carrier. With the body 10 maintained in the position shown in Figs. 2, 3, 8 and 9 the carrier 11 may be rotated on its axis $Z_1$, $Z'_1$, vertical in these figures, to the position shown in Fig. 3 so that the cam toe 11' actuates the contact 29. In accordance with Fig. 9 the circuit then may be established through the contact 26, through one of the contacts 29, shown in Figs. 9 and 11, to the motor 34, the circuit being completed through the rheostat 24 to the source of supply 40. Upon operation of the lever 12 in the plane shown in Fig. 3 the shaft 22 is rotated to move the movable member of the rheostat 24 so as to energize the motor 34.

When the body 10 is rotated to the position shown in Fig. 10, corresponding to that of Fig. 4, and the barrel shaped carrier 11 is maintained in the same position as in Fig. 3 relative to the body 10 its axis $Z_1$, $Z'_1$, becomes horizontal, as shown in Figs. 4 and 10, the cam toe 11' of the carrier 11 still engaging the contact 29. The cam toe 10' of the body 10 now engages the contact 27 to close this contact to establish the circuit from the supply through the contact 27 to the other contact 29 and to the motor 33 through the rheostat 23 associated therewith and then returning to the supply 40. The shaft 17 upon operation of the lever 12 in the vertical plane, as shown in Fig. 4, effects movement of the slide member of the rheostat 23 to energize the motor 33.

It will be appreciated that where, instead of using an electric system for controlling the machine members requiring to be shifted, a hydraulic system for example is used, the electric circuits shown in Figs. 8 to 10 should be replaced by hydraulic circuits, while the contacts 26 to 29 should be replaced by suitable equivalent members such as valves, cocks and the like.

Moreover, it should be observed that in each of its motions along the three axes OX, OY and OZ the lever 12 controls not only the starting and the stopping of the controlled member 2, 4, 5, 6 as well as the direction of its motion (this direction being the same as the direction in which the lever 12 is shifted) but also, similarly to the device described in the above-cited co-pending application, controls the speed of motion of the said member, such speed being greater as the lever is moved farther from its neutral position.

It will be seen from the foregoing that when the operator wants to control the motion of a member in a predetermined direction, it is sufficient for him merely to handle a single lever, thereby avoiding hesitation between several parts to be manipulated. He should then first bring the device 8 to the proper position, by movement of the body 10 or carrier 11, or both, (this being done instinctively by a mere consideration of the motion to be brought about), whereafter he must rock the lever 12 to the right or to the left, forwardly or backwardly, upwardly or downwardly according to the desired direction of to and fro movement, pushing the lever over a varying distance depending upon the speed to be imparted to the controlled member produces exactly the desired motion with proper accuracy and rapidity.

Consequently and as will be understood, the present invention provides a controlling system of particular simplicity, of very easy manipulation which only requires the exercise of the operator's instinct, also of very great flexibility while requiring only one lever.

Obviously the invention is applicable in a large number of cases. A detailed description has been given in the foregoing but merely by way of example of the application of the invention to a combined milling and boring machine but, as will be appreciated, the invention applies to any other type of machine tool, regardless of the number and nature of the movable members to be controlled and irrespective of the nature of motions to be effected (rectilinear, circular, etc.). The invention is also applicable to all other types of machines including movable members the motion of which at varying speeds should be either regulated or controlled.

Minor constructional details might be varied without departing from the scope of the subjoined claims.

What I claim is:

1. A device for the manual control of at least three movable members displaceable in three different spatial directions in a machine such as a machine tool, comprising actuators for said members, each of said actuators being adapted independently to run at various speeds, setting means operatively connected to the respective actuators for starting, stopping and varying the speed of motion thereof, transmission means operatively connected to the setting means to bring them to actuator-starting and actuator-stopping positions and to several positions corresponding to various speeds thereof, a supporting base, a single rockable control lever, a gear interconnecting the lever and transmission means, a body supported by the base, and a carrier for the lever, said carrier being rotatable in said body to different positions while the latter is in turn rotatable to different positions about an axis extending at right angles to the rotational axis of the lever carrier said body and said carrier being operatively connected to said setting means to establish in accordance with the relative positions of said body and said carrier said connection of said setting means to the respective actuators.

2. A device for the manual control of at least three movable members displaceable in three different spatial directions in a machine such as a machine tool comprising actuators for said members, each of said actuators being adapted independently to run at various speeds, setting means operatively connected to the respective actuators for starting, stopping and varying the speed of motion thereof, transmission shafts, operatively connected to the setting means to bring them to actuator-starting and actuator-stopping and the several positions corresponding to various speeds thereof, a supporting base, a single rockable control lever, a gear train interconnecting the lever and transmission shafts, a body supported by the base, a carrier for said lever, said carrier being rotatable in said body to different positions while the latter is in turn rotatable to different positions about an axis extending at right angles to the rotational axis of the lever carrier, said body and said carrier being operatively connected to said setting means to establish in accordance with the relative positions of said body and said carrier said connection of said setting means to the respective actuators, and means for temporarily locking said body to said supporting base and for temporarily locking said lever carrier to said body in the set positions.

3. A device for the manual control of at least three movable members displaceable in three different spatial directions in a machine such as a machine tool, comprising electric actuators for said members, each of said actuators being adapted independently to revolve at various speeds, setting means including resistors and movable wiper contacts connected to the respective actuators for starting, stopping and varying the speed of motion thereof, transmission shafts connected to said wiper contacts to adjust said setting means, a supporting base, a single rockable control lever, a gear train interconnecting the lever and transmission shafts, a body supported by the base, a carrier for said lever, said carrier being rotatable in said body to different positions while the latter is in turn rotatable to different positions about an axis extending at right angles to the rotational axis of the lever carrier, said body and said carrier being operatively connected to said setting means to establish in accordance with the relative positions of said body and said carrier said connection of said setting means to the respective actuators, and means for temporarily locking said body to said base and said lever carrier to said body in the set positions.

4. A device for the manual control of at least three movable members displaceable in three different spatial directions in a machine such as a machine tool, comprising electric actuators for said members, each of said actuators being adapted independently to revolve at different speeds, setting means including rheostats and wiper contacts movable over their resistors, said rheostats being connected respectively in the circuits feeding the actuators, transmission shafts connected to said wiper contacts, a supporting base secured to the machine frame, a single control lever rockable two directions in a gear train interconnecting the lever and transmission shafts, a hollow body supported by the base, a barrel-shaped carrier for said lever, said carrier being rotatable in said body to different positions while the latter is rotatable in the base to different positions about an axis at right angles to the rotational axis of the lever carrier, said body and said carrier being operatively connected to said setting means to establish in accordance with the relative positions of said body and said carrier said connection of said rheostats to the respective actuators, means for temporarily locking said body to said base and said lever carrier to said body in the set positions, and spring means urging the lever to its neutral middle position in each of its rocking planes.

5. A device for the manual control of at least three movable members displaceable in three different spatial directions in a machine such as a machine tool comprising electric actuators for said members, each of said actuators being revoluble at various speeds, setting means including rheostats and wiper contacts movable over their resistors, said rheostats being connected respectively in the circuits feeding the actuators, intergeared transmission shafts connected respectively to said wiper contacts, a supporting base secured to the machine frame, a single control lever rockable in two directions, a bevel gear train interconnecting the lever and one of said shafts, a hollow body supported by the base, a barrel-shaped carrier for said lever and accommodating said bevel gear train, said carrier being rotatable in said hollow body to different positions while the latter is rotatable in the base to different positions about an axis at right angles to the rotational axis of the lever carrier, said body and said carrier being operatively connected to said setting means to establish in accordance with the relative positions of said body and said carrier said connection of said rheostats to the respective actuators, locking means for holding together body and base and carrier and body in the set positions, and spring means associated with one element of the bevel gear for urging said lever to its neutral position in each of its rocking planes as determined by the positions of said body and carrier, said neutral position corresponding to no current feed of the corresponding actuator.

6. In a device for controlling the movement of a plurality of members of a machine tool or the like, each member being supported to be movable to and fro in a defined line of movement independently of the other members, the combination with a plurality of motors for driving the respective members, a plurality of control means respectively connected to said motors and operable to effect and to control the to and fro movements of the members driven by the respective motors, of a body supported to be rotatable on an axis to at least two different operating positions, a carrier supported by said body so as to be rotatable relative thereto upon an axis extending transversely of the axis of rotation of said body to at least two different operating positions of said carrier, a lever supported by and for pivotal movement thereof relative to said carrier upon an axis extending transversely of said axis of said carrier and operable for at least one position of said body in at least two different planes corresponding to said two operating positions of said carrier, means actuated by said body and said carrier and operatively connected to said plurality of control means for selectively conditioning the respective control means for controlling the respective motors in accordance with the relative positions of said body and said carrier, and means operatively connecting said lever to said control means to effect operation of said selected control means for energizing the motor controlled by said selected control means to move the member which said motor drives upon operation of said lever in the plane determined by the selected positions of said body and said carrier.

7. In a device for controlling the movement of a plurality of members of a machine tool or the like, each member being supported to be movable to and fro in a defined line of movement independently of the other members, the combination with a plurality of means respectively operable to effect and to control the to and fro movements of the respective members of the machine tool, of a body supported to be rotatable on an axis to at least two different operating positions, a carrier supported by said body so as to be rotatable relative thereto upon an axis extending transversely of the axis of rotation of said body to at least two different operating positions of said carrier, a lever supported by and for pivotal movement thereof relative to said carrier upon an axis extending transversely of said axis of said carrier and operable for at least one position of said body in at least two different planes corresponding to said two operating positions of said carrier, a plurality of groups of connectors, said groups being respectively operatively connected to said means respectively operable to effect and to control the to and fro movements of the respective members of the machine tool, the connectors of each group being arranged in series and being respectively actuated by said body and said carrier to establish the connection of the group to a selected control means corresponding to the selected positions of said body and said carrier, and means operatively connecting said lever to the control means corresponding to the selected positions of said body and said carrier for effecting the to and fro movement of the member of the machine tool controlled by said selected control means upon operation of said lever.

8. In a device for controlling the movements of a plurality of members of a machine tool or the like, the combination as defined in Claim 6 in which said motors are electric motors and said control means comprise electrical means connected in circuit with said motors, said means actuated by said body and said carrier and operatively connected to said control means comprising a plurality of groups of switches, the switches of each group being connected in series with each other and with a given electrical control means and being respectively actuated by said body and said carrier to establish the circuit through said given electrical control means to the motor which drives a selected member when said body and said carrier are in selected positions, said lever in the position thereof determined by the selected positions of said body and said carrier being operatively connected to said given electrical control means so as to energize the motor corresponding to the selected positions of said body and said carrier for effecting the to and fro movement of the selected member controlled by said given electrical control means upon operation of said lever.

9. In a device for controlling the movements of a plurality of members of a machine tool or the like, the combination as defined in Claim 6 in which the axes of rotation of said body and of said carrier respectively are parallel to the lines of movement of two of the movable members of the machine tool and said body and said carrier are supported for movement thereof on said axes with respect to the machine tool and with respect to each other to position said lever in the planes respectively parallel to the movements of said members of the machine tool which are controlled by the respective control means to which said lever is connected.

10. In a device for controlling the movements of a plurality of members of a machine tool or the like, each member being supported to be movable to and fro in a defined line of movement independently of the other members, the combination with a plurality of motors for driving the respective members, a plurality of control means respectively connected to said motors and operable to effect and to control the to and fro movements of the members driven by the respective motors, of a body supported to be rotatable on an axis to at least two different operating positions, a carrier supported by said body so as to be rotatable relative thereto upon an axis extending transversely of the axis of rotation of said body to at least two different operating positions of said carrier, a manually operable member supported by and for movement thereof relative to said carrier and operable for at least one position of said body in at least two different planes corresponding to the two operating positions of said carrier, means actuated by said body and said carrier and operatively connected to said plurality of control means for selectively conditioning the respective control means for controlling the respective motors in accordance with the relative positions of said body and said carrier, and means operatively connecting said manually operable member to said control means to effect operation of said selected control means for energizing the motor controlled by said selected control means to move the member which said motor drives upon operation of said manually operable member in the plane determined by the selected position of said body and said carrier.

11. In a device for controlling the movements of a plurality of members of a machine tool or the like, the combination as defined in Claim 10 in which said body and said carrier supported thereby are supported with respect to said machine tool and in relation to each other so that the axis of rotation of said body is parallel to the line of movement of one of said movable members of the machine tool and the axis of rotation of said carrier is parallel respectively to the lines of movement of two other movable members of the machine tool in the respective positions to which said rotatable body is rotated, whereby for said selected positions of said body and said carrier said manually operable member is movable respectively in the directions parallel to the movements of the respective members of the machine tool which are controlled by the respective control means to which said manually operable means is connected.

CHARLES WILLIAM BERTHIEZ.

No references cited.

Certificate of Correction

Patent No. 2,466,198.

April 5, 1949.

CHARLES WILLIAM BERTHIEZ

It is hereby certified that errors appear in the printed specification of the above numbered patent requiring correction as follows:

Column 7, line 41, claim 1, after the word "carrier", first occurrence, insert a comma; column 8, line 38, claim 4, after "rockable" insert *in*; same line, strike out "in" after "directions" and insert instead a comma; column 10, line 55, claim 10, for "despective" read *respective*;

and that the said Letters Patent should be read with these corrections therein that the same may conform to the record of the case in the Patent Office.

Signed and sealed this 20th day of September, A. D. 1949.

[SEAL]

JOE E. DANIELS,
*Assistant Commissioner of Patents.*